United States Patent
Olczak

(10) Patent No.: US 7,876,499 B1
(45) Date of Patent: Jan. 25, 2011

(54) OBJECTIVE LENS

(75) Inventor: Eugene G. Olczak, Pittsford, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 377 days.

(21) Appl. No.: 11/948,508

(22) Filed: Nov. 30, 2007

(51) Int. Cl.
G02B 23/24 (2006.01)
G02B 21/36 (2006.01)
G02B 9/62 (2006.01)
G02B 11/02 (2006.01)

(52) U.S. Cl. ...................................... 359/362; 359/756
(58) Field of Classification Search .................. 359/362, 359/756–762
See application file for complete search history.

(56) References Cited

U.S. PATENT DOCUMENTS

| | | | | |
|---|---|---|---|---|
| 3,865,471 A | * | 2/1975 | McCrobie | 359/760 |
| 4,269,477 A | * | 5/1981 | Kitagawa | 359/758 |
| 4,690,518 A | * | 9/1987 | Kouchiwa et al. | 359/740 |
| 5,073,018 A | * | 12/1991 | Kino et al. | 359/368 |
| 5,386,112 A | * | 1/1995 | Dixon | 250/234 |
| 5,610,719 A | * | 3/1997 | Allen et al. | 356/614 |
| 5,708,532 A | * | 1/1998 | Wartmann | 359/663 |
| 6,185,030 B1 | * | 2/2001 | Overbeck | 359/225.1 |

* cited by examiner

Primary Examiner—Michael A Lyons
(74) Attorney, Agent, or Firm—RatnerPrestia

(57) ABSTRACT

An objective lens and a method for using same. The objective lens has a first end, a second end, and a plurality of optical elements. The optical elements are positioned between the first end and the second end and are at least substantially symmetric about a plane centered between the first end and the second end.

13 Claims, 8 Drawing Sheets

OBJECTIVE LENS

STATEMENT REGARDING FEDERALLY SPONSORED RESEARCH

The invention described herein was made in the performance of work under NASA Contract No. NAS5-02200 and is subject to the provisions of Section 305 of the National Aeronautics and Space Act of 1958 (42 U.S.C. §2457).

FIELD

The invention pertains to optics and, more particularly, to an objective lens and a system and method for using an objective lens.

BACKGROUND

An objective lens, sometimes referred to as a diverger, may be used to transform a collimated beam into a diverging (or converging) beam. In the field of interferometry, an objective lens may be used with an interferometer to address a part under test. The objective lens transforms a collimated beam from the interferometer into a diverging (or converging) beam that fills the numerical aperture of a part under test. The part may be directly addressed, as is typical for a spherical surface, or addressed through a null lens or other apparatus.

SUMMARY

In one aspect, the invention comprises an objective lens having a first end, a second end, and a plurality of optical elements. The optical elements are positioned between the first end and the second end and are at least substantially symmetric about a plane centered between the first end and the second end.

In another aspect, the invention comprises a system for directing light to a device. The system includes an objective lens and a wavefront sensor. The objective lens has a first end, a second end, and a plurality of optical elements. The plurality of optical elements are positioned between the first and second ends and at least substantially symmetric about a plane centered between the first and second ends. The objective lens is configured to receive a light beam from a light source at its first end and direct such light out from its second end to the device. Light returned from the device is received at the second end of the objective lens and directed by the objective lens out from its first end to the wavefront sensor.

In another aspect, the invention comprises a method for characterizing a device. Light is generated and directed to an objective lens. The objective lens has a first end, a second end, and a plurality of optical elements positioned between the first end and the second end. The plurality of optical elements are at least substantially symmetric about a plane centered between the first end and the second end. The generated light is directed to the first end of the objective lens and output from the second end of the objective lens to the device. Light returned from the device is received at the second end of the objective lens and is output from the first end of the objective lens to a wavefront processor. The wavefront processor processes the returned light received from the objective lens to characterize the device.

In yet another aspect, the invention comprises an objective lens having a first end, a second end, and a plurality of optical elements positioned between the first end and the second end. The objective lens is configured to receive light at the second end from a device and to produce an image of the device at or near the first end such that more than 1,800 cycles of optical resolution are provided across the extent of the image of the device.

DETAILED DESCRIPTION

Figure 1:
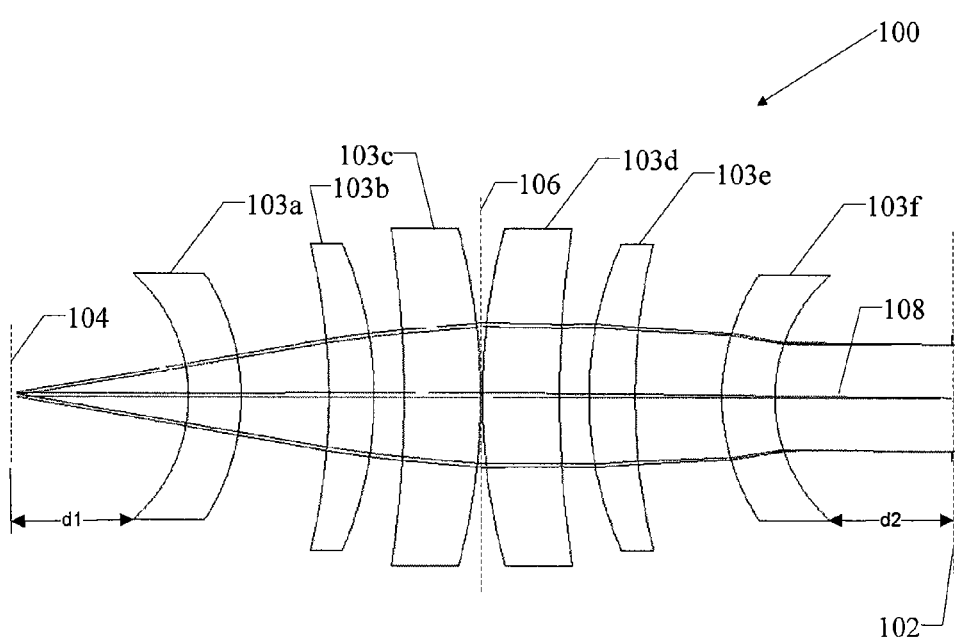
FIG. 1 illustrates an objective lens according to an exemplary embodiment of the invention.

An objective lens may be optimized to deliver a diffraction limited beam to a device or a part under test. A pupil conjugate wavefront sensor, such as an interferometer, for example, receives a pupil image from incoming light for wavefront evaluation. The imaging performance of a typical objective lens with respect to the pupil is not optimal.

An objective lens according to an exemplary embodiment of the invention provides diffraction limited optical performance at two sets of conjugates. The first conjugate provides for delivery of a diffraction limited wavefront in response to a substantially collimated light input. The diffraction limited wavefront may be provided to a device. The collimated light input may be received from the optical output of an interferometer, from a single pass sensor, or from an object at or near infinity, for example. The second conjugate provides high resolution of the device or part under test in the plane of evaluation of the wavefront sensing instrument, for example.

An exemplary objective lens 100 is described with reference to FIG. 1. The exemplary objective lens 100 employs a symmetrical (or substantially or nearly symmetrical) optical. The objective lens 100 includes a plurality of optical surfaces 103a-f that are positioned along an optical axis 108 that forms the objective lens 100.

In the exemplary embodiment described with reference to FIG. 1, the optical elements 103a-f are made of glass. The invention encompasses, however, optical elements 103a-f that are reflective and optical elements 103a-f that are made of other materials. For example, the optical elements 103a-f may comprise polycarbonate, zinc selenide (ZnSe), and silicon for refractors and aluminum, copper and berilium for mirrors.

A first surface 102 that is a stop (to be at least approximately co-located at, for example, an interferometer entrance port) is positioned behind the optical elements 103a-f. The stop 102 is positioned a distance d2 (i.e., the back focal distance) behind optical element 103f in this exemplary embodiment. A focal surface 104 is located a distance d1 in front of the objective lens 100 that is substantially equivalent to the distance d2 that the stop 102 is located behind the objective lens 100. The design of the optical elements 103 comprising the exemplary objective lens 100 is such that the surfaces of the optical elements 103 are substantially symmetrical about a line 106 that is perpendicular to the optical axis 108 and located midway between the stop 102 and the focal surface 104. The image field of the lens 100 corresponds to the pupil size to be imaged.

Figure 2:
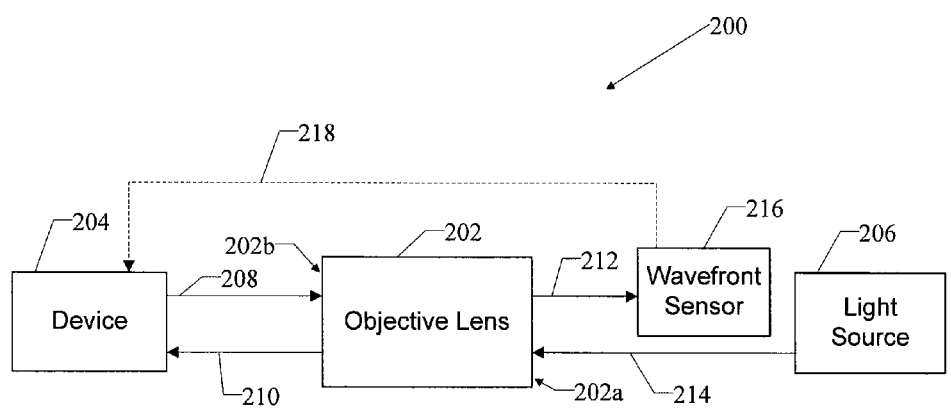
FIG. 2 illustrates a block diagram of a system according to an exemplary embodiment of the invention.

A block diagram of an exemplary system 200 for directing light to a device is shown in FIG. 2. The system 200 includes an objective lens 202 according to an exemplary embodiment of the invention. The objective lens 202 has a first end 202a for receiving a light beam 214 from a light source 206. The objective lens 202 directs a corresponding light beam 210 out from its second end 202b to a device 204. Exemplary embodiments encompass the device 204 being a mirror, an assembly of mirrors, deformable mirrors, a telescope, an optical assembly to be aligned, or any combination thereof. Light 208 returned from the device 204 is received at the second end 202b of the objective lens 202. The objective lens 202 directs the corresponding light 212 from its first end. As shown in FIG. 2, the light 212 is not necessarily directed back to the light source 206. In the exemplary embodiment shown in FIG. 2, the light 212 is directed to a wavefront sensor or processor 216. Such a sensor 216 may be an optical pattern recognition device, for example.

In an exemplary embodiment, the wavefront processor 216 processes the returned light 212 received from the objective lens 202 to characterize the device 204. For example, the wavefront processor 216 may process the returned light 212 to identify surface details of the device 204. In an exemplary embodiment, the device 204 is a segmented mirror including a plurality of mirror segments and the wavefront sensor 216 provides information regarding the orientation of the mirror segments. The orientation information is fed back (see feedback path 218 shown in phantom in FIG. 2) to the device 204 for correcting or adjusting the orientation of the mirror segments in response to the identified surface details.

Exemplary embodiments of the invention encompass the light 212 being directed to the same device that provides the source of light. For example, the source light 214 may be provided by an interferometer and the light 212 directed from the first end 212 of the objective lens 202 may be directed back to the interferometer.

Figure 3A:
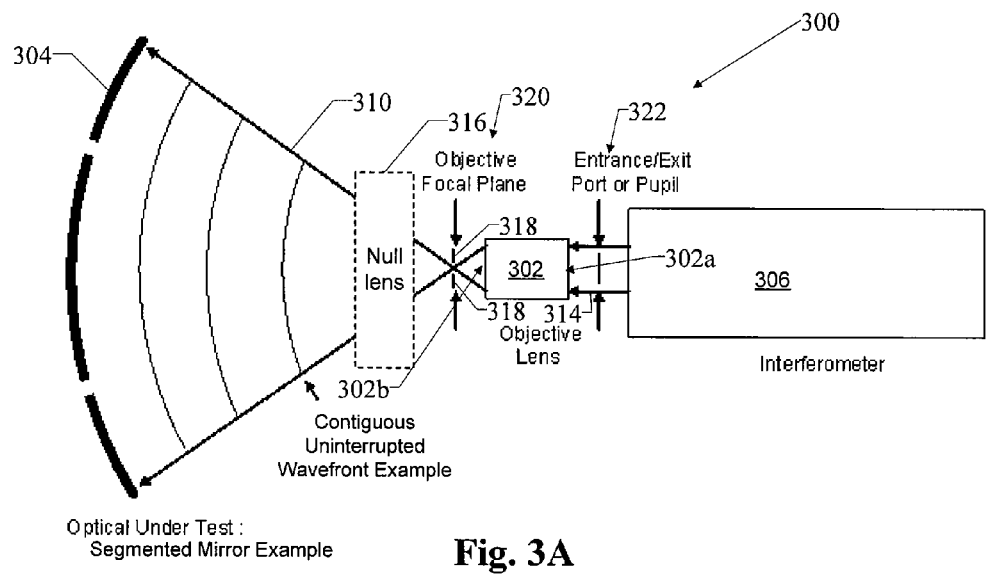
FIGS. 3A and 3B illustrate forward and return light paths, respectively, in a system according to an exemplary embodiment of the invention.
Figure 3B:
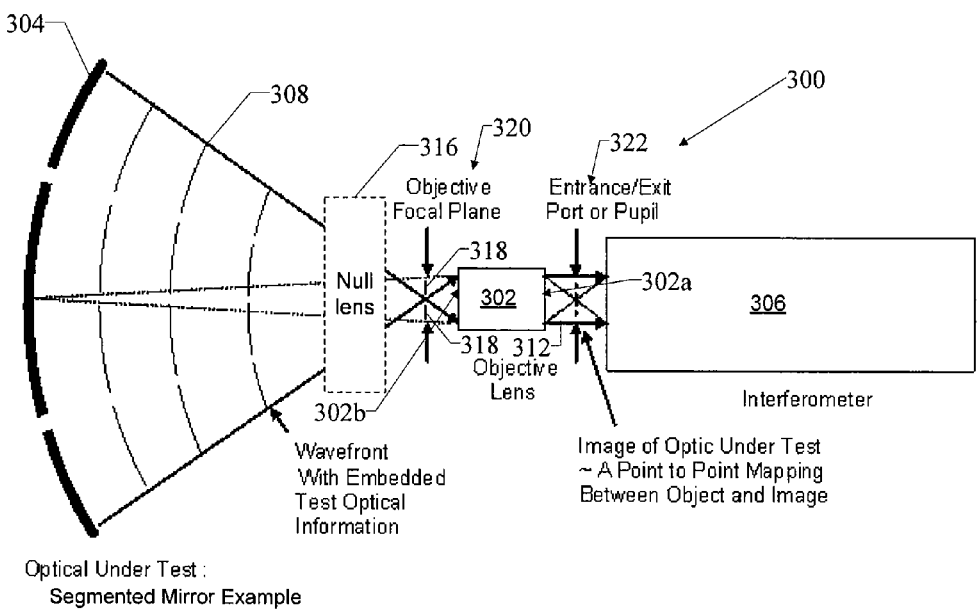

An exemplary system 300 for directing light to a device is shown in FIGS. 3A and 3B. The forward light path is illustrated in FIG. 3A and the return light path is illustrated in FIG. 3B. The system 300 includes an objective lens 302 according to an exemplary embodiment of the invention, an interferometer 306, and a device 304. The device 304 in this exemplary embodiment is a segmented mirror. The objective lens 302 directs light received from the interferometer 306 to the segmented mirror 304 and directs light returned from the segmented mirror 304 to the interferometer 306.

With reference to FIG. 3A, the objective lens 302 receives light 314 from the interferometer 306 at the first end 302a of the objective lens 302. The objective lens 302 directs corresponding light 310 from its second end 302b to the segmented mirror 304. In an exemplary embodiment, the system 300 may optionally include a nulling device or null lens 316 as shown in phantom in FIGS. 3A and 3B. In an exemplary embodiment, the nulling device 316 is a nulling apparatus as described in U.S. patent application Ser. No. 11/268,014 entitled Optical Nulling Apparatus and Method For Testing an Optical Surface (filed Nov. 7, 2005) which is hereby incorporated in its entirety by reference. The nulling device or element 316 receives light from the second end 302b of the objective lens 302 and directs such light to the device 304 and receives light 308 returning form the device 304 and directs such light to the second end 302b of the objective lens 302.

With reference to FIG. 3B, light 308 returned from the segmented mirror 304 is received at the second end 302b of the objective lens 302. The objective lens 302 directs corresponding light 312 from its first end to form a pupil image 322 received by the interferometer 306.

The objective lens 302 of the system 300 propagates the light 308 backwards from the optic under test 304 to the entrance pupil 322 of the interferometer 306. In an exemplary embodiment, the system 300 includes a field stop 318 placed at the focal surface 320. The field stop 318 may act as an aperture stop for the pupil image.

In an exemplary embodiment, the objective lens 302 of the system 300 as shown in FIGS. 3A and 3B has image entrance pupil diameter of 7 mm and includes six optical elements 103a-f shown in FIG. 1. The entrance pupil diameter value may be chosen to match the entrance pupil size of the interferometer 306. The exemplary system 300 is designed at F/3 and is intended for use in a center of curvature test that employs a null lens 316 and interferometer 306 with a wavelength of 680 nm. The dimensions, thicknesses, and spacing of the optical elements 103a-f for the exemplary objective lens 300 are shown in the table below.

TABLE

| Surface | Radius | Thickness | Diameter |
|---|---|---|---|
| Objective | Infinity | Infinity | 0 |
| Stop | Infinity | 11.50377 | 7 |
| 2 | −10.64284 | 3.435699 | 16 |
| 3 | −14.51563 | 5.690045 | 16 |
| 4 | −41.55596 | 2.980398 | 20 |
| 5 | −24.66314 | 1.944074 | 20 |
| 6 | −71.53273 | 4.999993 | 22 |
| 7 | −41.9546 | 0.1284097 | 22 |
| 8 | 41.9546 | 4.999993 | 22 |
| 9 | 71.53273 | 1.944074 | 22 |
| 10 | 24.66314 | 2.980398 | 20 |
| 11 | 41.55596 | 5.690045 | 20 |
| 12 | 14.51563 | 3.435699 | 16 |
| 13 | 10.64284 | 11.50377 | 16 |
| IMA | Infinity |  | 7.001023 |

With reference to the table above, element 103f corresponds to surface number 2 in the table above having a radius of 10.64284 mm, a thickness of 3.435699 mm, and a diameter of 16 mm. The left surface of element 103f corresponds to surface number 3 in the table above, indicating that there is a thickness of 5.690045 mm between element 103f and element 103e. The dimensions and spacing of the other optical elements 103 may similarly be determined based on the exemplary configuration specified in the table above. The device defined by the dimensions in the table above has a objective lens effective focal length or distance of 21 mm, a pupil size of 7 mm, and a back focal distance of 11.5 mm.

In an exemplary embodiment, the radius of the last (or outermost) surface of the objective lens closely matches the distance to the focal surface. Such a design can be used with a Fizeau interferometer to provide the proper wavefront shape for a reference beam. In an exemplary embodiment, the percentage difference between the radius of the outermost surface and the distance to the focal surface is less than about 8%. With reference to the dimensions in the table above for example, the radius of the outermost surface (surface no. 2 in the table) is 10.64264 mm and the distance to the focal surface (i.e., the "thickness" of the "stop" surface in the table above) is 11.50377. The percentage difference in this example is 7.4% (i.e., (11.50377−10.64284)/11.50377).

Figure 4:
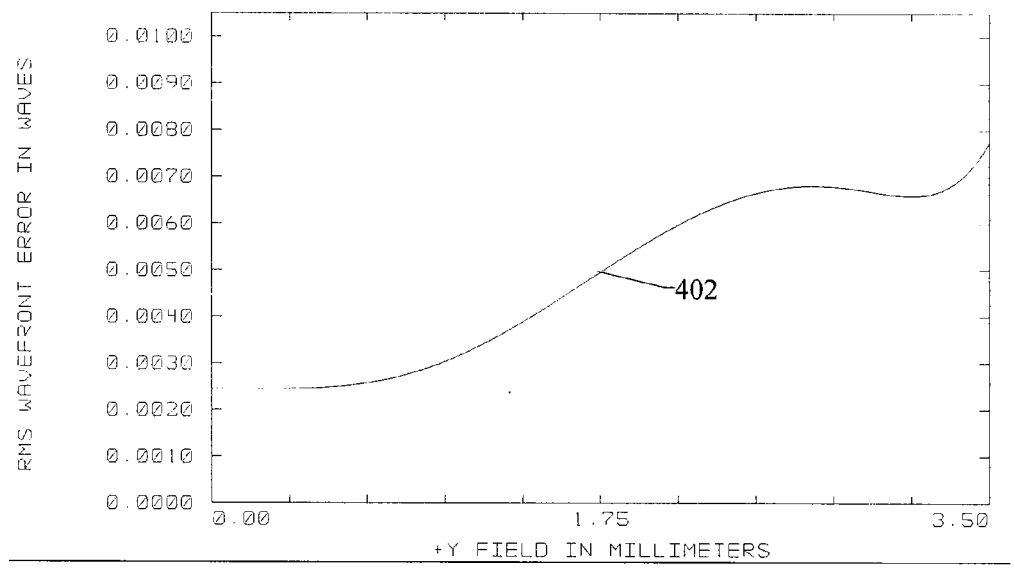
FIG. 4 is a plot of root mean square (RMS) wavefront error for a system according to an exemplary embodiment of the invention.

FIG. 4 shows the wavefront performance for the system 300 shown in FIGS. 3A and 3B. The plot 402 of RMS wavefront error for the system 300 illustrates that the system is very well corrected, with less than one hundredth (1/100) wave RMS wavefront error at the edge of the field (using a wavelength of light for which the lens is designed). In an exemplary embodiment, the objective lens 300 is configured to produce diffraction limited spots from its first end and from its second end where the RMS wavefront error is less than about one tenth (1/10) of a wave in the field of the lens. As used in relation to this exemplary embodiment, the term "field" can be defined as the area or extent of the object to be imaged by the objective lens or as the area or extent of the image that is produced by the objective lens.

An exemplary advantage of an objective lens according to an exemplary embodiment of the invention may be understood by considering that the pupil image of the system 300 is propagated backwards from the optic under test 304 (e.g., a segmented mirror) to the entrance pupil 322 of the interferometer 306. In an exemplary embodiment, a field stop 318 placed at the focal surface 320 acts as the aperture spot for the pupil image. Although the optic under test 304 is not typically at "infinity," it is typically at a distance that is very large compared to the focal length of the objective lens 302.

Accordingly, exemplary embodiments of the invention encompass a symmetric objective lens designed for an optic under test positioned at "infinity." An objective lens may be configured to receive substantially collimated light at the first end and output corresponding focused light from the second end and to receive substantially collimated light at the second end and output corresponding focused light from the first end. Other exemplary embodiments of the invention encompass optimizing the objective lens for an optic under test positioned at a "finite" distance from the objective lens, by some deviation in symmetry, for example. In an exemplary embodiment of the invention, the objective lens is configured to receive light from a substantially collimated source at its first end and to receive light from a device at least 1.5 meters away from its second end.

In the exemplary embodiment described above with reference to FIGS. 3A and 3B, the pupil and image sizes are substantially equal. This provides pupil resolution that is consistent with the working F/# of the interferometer. In another exemplary embodiment, the system 200 (see FIG. 2) could be optimized (in a single or multiple configurations) with a larger or smaller F/# so that the pupil resolution can be more or less that the F/# required to illuminate the device 204 (e.g., a segmented mirror or an optic under test). In other words, the objective lens may be designed to work at different configurations (i.e., "zoom positions" or "zoomed system configurations") with respect to F/#, object distance, image distance, wavelength and/or other parameters.

Figure 5:
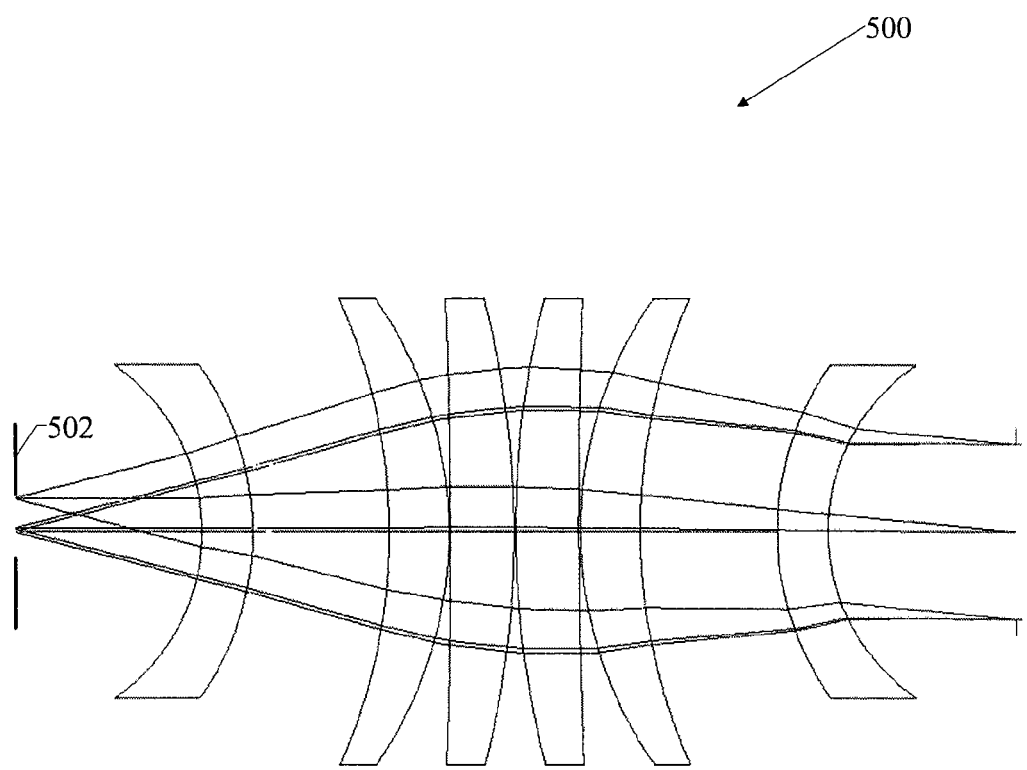
FIG. 5 illustrates an objective lens according to another exemplary embodiment of the invention.

For example, in another exemplary objective lens 500 shown in FIG. 5, the F/# has been decreased to F/2 by increasing the stop 502 diameter to 10.5 mm. An interferometer may still deliver a 7 mm F/# beam to the objective lens 500, but the larger aperture 502 provides still higher pupil resolution. This design is also diffraction limited across the field.

In an exemplary embodiment, the objective lens has a first end, a second end, and a plurality of optical elements positioned between the first end and the second end. The objective lens and its optical elements are configured to receive light at the second end from a device and produce an image of the device at or near the first end such that more than 1,800 cycles of optical resolution are provided across the extent of the image of the device. This level of optical resolution allows for the exploitation of sample resolutions of nearly 13 Mega pixels (3600×3600). The term "extent" as used herein means the largest dimension of the device (e.g., a diameter of a circular device, a diagonal of a rectangular device). In an exemplary embodiment, the light transmitted from the second end to the device has a coherent diffraction limited wavefront. In an exemplary embodiment, the device is an optical surface or assembly with an extent greater than 250 millimeters.

In an exemplary application of the objective lens according to an exemplary embodiment of the invention, the wavefront on axis will be most important; this is where the test wavefront is generated. Image quality at the pupil edge may be relaxed. The on axis performance determines the quality of the wavefront that can be delivered to the device. This then determines the quality of wavefront measure that the wavefront sensor can deliver regardless of the resolution of the image of the device. The wavefront at the pupil edge effects the optical resolution of the image of the device and, in an exemplary application, some compromise in performance may be acceptable.

Figure 6:
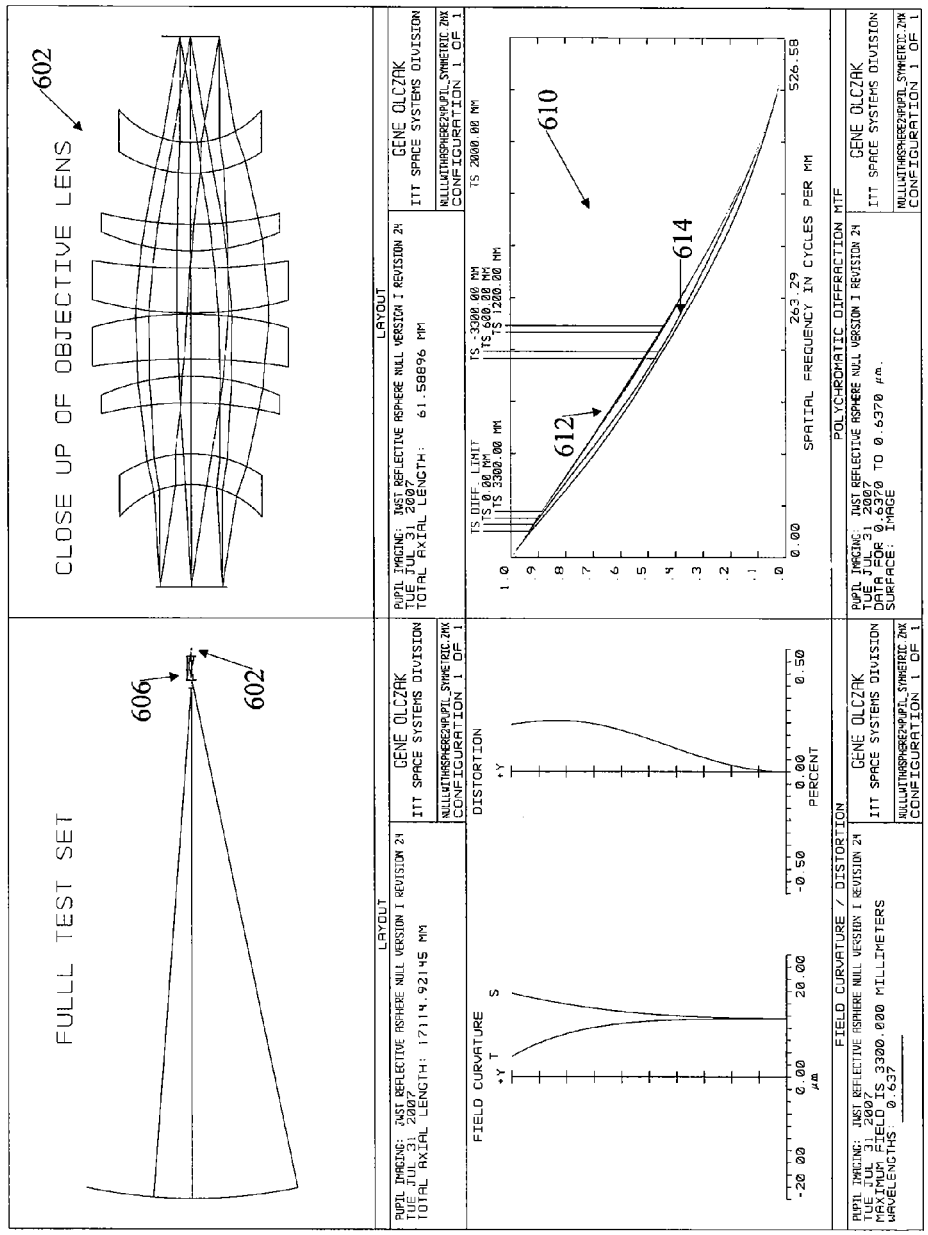
FIG. 6 illustrates an exemplary objective lens and a plot of its corresponding modulation transfer function according to an exemplary embodiment of the invention.
Figure 7:
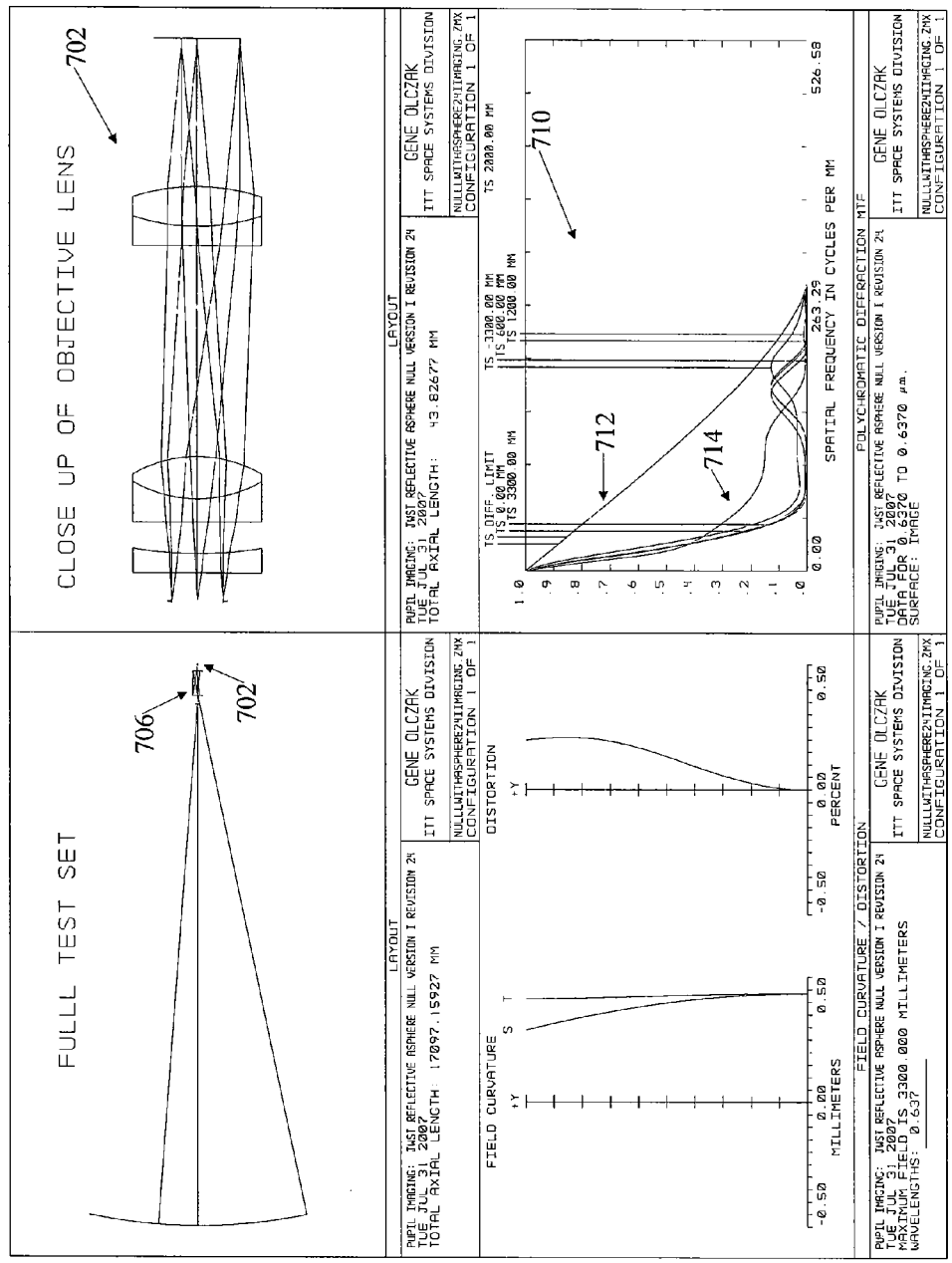
FIG. 7 illustrates a conventional objective lens and a plot of its corresponding modulation transfer function.

The pupil imaging performance of an objective lens according to an exemplary embodiment of the invention is compared to a conventional objective lens with reference to FIGS. 6 and 7. With reference to FIG. 6, there is shown another exemplary objective lens 602 according to an embodiment of the invention. The objective lens 602 is diffraction limited across the pupil image conjugate working with a F/3 image space stop. The modulation transfer function (MTF) of the objective lens 602 as used in a test system including a nulling lens 606 is illustrated by the plot 610 in FIG. 6. The diffraction MTF computation is based upon an FFT of the pupil data. The resulting MTF is the modulation as a function of spatial frequency for a sine wave object. For example, if a sine object of a particular frequency has a minimum intensity of 0 watts per square meter and a maximum intensity of 10 watts per square meter, then for an MTF of 0.5 the image may have a minimum intensity of 2.5 watts per square meter and a maximum intensity of 7.5 watts per square meter (ignoring transmission losses). The tangential response corresponds to a periodic target oriented with lines along the object space X axis, and the sagittal response corresponds to a periodic target oriented with lines along the object space Y axis. The spatial units are computed at the image (all units are normalized to remove magnification effects).

The predicted MTF performance of an exemplary embodiment of the invention is diffraction limited. The DIFF LIMIT reference line 612 in the plot shows the MTF for the ideal zero RMS wavefront error condition and the lines 614 show the actual performance of the system according to an exemplary embodiment of the invention. The shape of the curves are a representation of the typical incoherent MTF. The cut off frequency (MTF=0) is around 526 cycles/millimeter. The MTF=0.5 point is around 257 cycles/millimeter. If the exemplary system were used with coherent illumination, the cut off would be about the same as the MTF=0.5 point (typically half the frequency of the incoherent cut off). In an exemplary diffraction limited system, the coherent MTF does not taper off gradually. Instead, it falls off abruptly from MTF=1 (ignoring transmission losses). An exemplary embodiment of the invention may be used with either coherent or incoherent illumination. Here the optical resolution will be defined as the spatial frequency where the incoherent MTF=0.5 multiplied by the image extent (regardless of whether the system is used with coherent or partial illumination, Quadra pole illumination, etc.). So for an exemplary embodiment of the invention, the optical resolution is 1,800 cycles (257 cycles/millimeter multiplied by 7 mm).

With reference to FIG. 7, there is shown a conventional objective lens 702. The conventional lens 702 is corrected for delivering the test wavefront (not shown) but lacks the symmetry properties of exemplary embodiments of the invention. The modulation transfer function (MTF) of the objective lens 702 as used in a test system including a nulling lens 706 is illustrated by the plot 710 in FIG. 7. The DIFF LIMIT reference line 712 in the plot shows the MTF for the ideal zero RMS wavefront error condition and the lines 714 show the actual performance of the system with the conventional objective lens 702. The plot 710 illustrates that the objective lens 702 has significant aberrations and corresponding loss of MTF at F/5.4. A system using the conventional lens 702 must be stopped down to F/10 to achieve comparable performance relative to the diffraction limit. There is no configuration (with respect to F/#) of the conventional lens 702 that has better than one third of the resolving power of the objective lens 602 (see FIG. 6) according to an exemplary embodiment of the invention.

Figure 8:
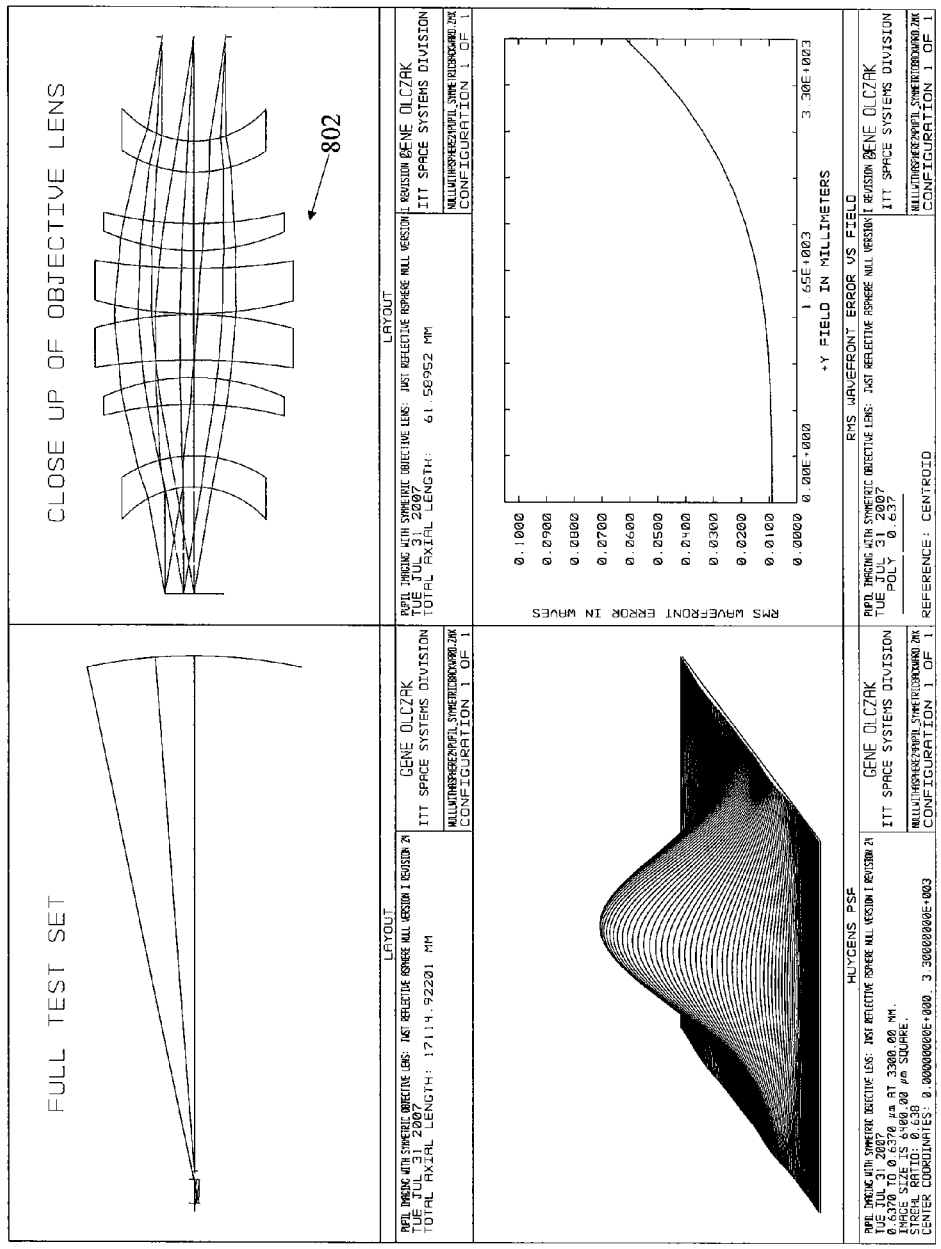
FIG. 8 is a plot of RMS wavefront error for a system according to an exemplary embodiment of the invention.

In an exemplary embodiment, an exemplary objective lens is used to deliver a scanning spot to a surface under test. In this case, an optical source spot is delivered to the lens pupil such that it matches the F/# of the objective lens for the optic under test conjugate. This produces a diffraction limited spot at the optic under test. For example, as illustrated in FIG. 8, an exemplary objective lens 802 is used to produce a 4 mm full width half maximum spot at the outer edge of a 6,600 mm diameter primary mirror.

Although the invention is described above with reference to particular exemplary embodiments of the invention, the scope of the invention is not limited thereto. For example, exemplary embodiments of the invention encompass having an entrance pupil size in the range of 1 mm to 400 mm. In addition, exemplary embodiments of the invention encompass having objective lenses having an effective focal length ranging from the millimeter range to 20 meters. In an exemplary embodiment, the optical elements of the objective lens positioned at the first and second ends have radii within 15% of a back focal length of the objective lens.

In an exemplary embodiment, an objective lens may be achromatized (e.g., if working in glass). For a given F/# and field, this will generally require more optical elements and some use of alternating flint and crown type glasses. That is, some or all of the optical elements 103 (see FIG. 1) may be split into cemented or air spaced doublets. Low dispersion glasses may also be employed in an achromatized design of an exemplary objective lens.

Another exemplary embodiment of the invention encompasses using an exemplary objective lens in a focus or phase diversity sensor. The exemplary objective lens may be used in combination with a dispersed Hartmann sensor that has GRISMS (combination grating and prism) or other devices (filters/lenses/prisms/gratings/masks) in the pupil. A exemplary application of such a system might be as a collimating lens in an optical instrument for a telescope observatory.

Exemplary embodiments of objective lenses are described above as having six optical elements. The invention is not limited to a particular number of optical elements. Embodiments of the invention encompass having 2, 4, 6, 8, . . . and other combinations of substantially symmetrical optical elements. Further, exemplary embodiments of the invention encompass an objective lens having optical elements that are not spherical.

An objective lens according to an exemplary embodiment of the invention is capable of working over a wide field in comparison to conventional objective lenses. For example, in a system according to an exemplary embodiment of the invention, wavefront data from the device (e.g., 304) may be effectively received (def: with good wavefront quality or substantially diffraction limited) at surface 104 (or 320) when the object field has an extent of up to 7 millimeters. In contrast, conventional interferometer object lenses have an object field with an extent of less than 1 mm (for a similar F/#).

The performance analysis (MTF, etc.) information of exemplary embodiments of the invention provided herein is from optical design software and simulation. Some of the information provided herein was output using the ZEMAX-EE Optical Design Program and may be similarly be generated using other optical design programs (e.g., Code V).

Although the invention is illustrated and described herein with reference to specific embodiments, the invention is not intended to be limited to the details shown. Rather, various modifications may be made in the details within the scope and range of equivalents of the claims and without departing from the invention. The foregoing describes the invention in terms of embodiments foreseen by the inventors for which an enabling description was available, although insubstantial modifications of the invention, not presently foreseen may nonetheless represent equivalents thereto.

What is claimed is:

1. An objective lens comprising:
   a first end;
   a second end;
   a plurality of optical elements positioned between the first end and the second end and at least substantially symmetric about a plane centered between the first end and the second end; and
   the objective lens configured to simultaneously (a) receive substantially collimated light at the first end and output corresponding focused light from the second end and (b) receive substantially collimated light at the second end and output corresponding focused light from the first end.

2. The objective lens of claim 1 configured to produce diffraction limited spots from the first end and from the second end where the diffraction limited spots have an RMS wavefront error less than about one tenth of a wave.

3. The objective lens of claim 1 configured to receive light from a substantially collimated source at the first end and to receive light from a device at least 1.5 meters away from the second end.

4. The objective lens of claim 1 configured to receive light at the first end, transmit corresponding light from the second end to a device, receive a light response at the second end from the device and transmit light from the first end to form an image of the device responsive to the light response received at the second end.

5. The objective lens of claim 1 configured to transmit light from and receive light at the second end with a wide field.

6. The objective lens of claim 1 wherein one of the plurality of optical elements positioned at the first end and another of the plurality of optical elements positioned at the second end each have respective radii within 15% of a back focal length of the objective lens.

7. The objective lens of claim 1 comprising six optical elements.

8. An objective lens of claim 1
   wherein the objective lens is configured to receive light at the second end from a device and produce an image of the device at or near the first end such that more than 1,800 cycles of optical resolution are provided across the extent of the image of the device.

9. The objective lens of claim 8 configured to receive light at the first end, transmit light from the second end to the device, and receive a light response at or near the second end from the device to produce the image of the device.

10. The objective lens of claim 9 where the transmitted light from the second end to the device has a coherent diffraction limited wavefront.

11. The objective lens of claim 8 where the device is an optical surface or assembly with an extent greater than 250 millimeters.

12. An objective lens comprising:
   a first end;
   a second end; and
   a plurality of optical elements positioned between the first end and the second end and at least substantially symmetric about a plane centered between the first end and the second end;
   wherein a point source disposed on a focal surface at a first distance from the first end is collimated as a light beam at a second distance from the second end.

13. An objective lens comprising:
   a first end;
   a second end;
   a plurality of optical elements positioned between the first end and the second end and at least substantially symmetric about a plane centered between the first end and the second end; and
   the objective lens configured to simultaneously (a) receive substantially collimated light at the first end and output corresponding focused light from the second end and (b) receive substantially collimated light at the second end and output corresponding focused light from the first end,
   wherein a pupil image is formed at the second end.

* * * * *